United States Patent [19]

LaRocca et al.

[11] Patent Number: 4,856,363
[45] Date of Patent: Aug. 15, 1989

[54] PARKING BRAKE ASSEMBLY

[75] Inventors: William J. LaRocca, Sterling Heights; David M. Trush, Warren, both of Mich.

[73] Assignee: Wickes Manufacturing Company, Southfield, Mich.

[21] Appl. No.: 154,266

[22] Filed: Feb. 10, 1988

[51] Int. Cl.⁴ .............................................. G05G 1/04
[52] U.S. Cl. .......................................... 74/535; 74/523
[58] Field of Search ................... 74/523, 501.6, 502.2, 74/527, 535, 489, 475, 142, 177 R, 536, 537, 538

[56] References Cited

U.S. PATENT DOCUMENTS

| 1,823,695 | 9/1931 | Moorhouse . | |
| 2,467,557 | 4/1949 | Jandus | 74/535 |
| 2,816,456 | 12/1957 | Senkowski et al. | 74/540 |
| 2,893,262 | 7/1959 | Krause | 74/536 |
| 2,986,046 | 5/1961 | Vigmostad | 74/540 |
| 3,273,418 | 9/1966 | Ellis | 74/539 |
| 3,511,107 | 5/1970 | Yasiro | 74/512 |
| 4,512,210 | 4/1985 | Gurney | 74/535 |
| 4,515,036 | 5/1985 | Dotson | 74/535 |
| 4,570,508 | 2/1986 | Nicholson | 74/535 |
| 4,620,453 | 11/1986 | Kumazawa | 74/538 |

FOREIGN PATENT DOCUMENTS

| 2546111 | 5/1977 | Fed. Rep. of Germany | 74/523 |
| 2582272 | 11/1986 | France | 74/501.6 |

Primary Examiner—Gary L. Smith
Assistant Examiner—Flemming Saether
Attorney, Agent, or Firm—David A. Greenlee

[57] ABSTRACT

A parking brake assembly is provided including a sleeve or torque tube for locking or releasing a parking brake. The assembly includes a mounting bracket, an axle extending through the bracket, and a U-shaped handle assembly secured to the ends of the axle. A ratchet is secured to the mounting bracket. A pawl is pivotably mounted adjacent to the ratchet. The pawl is connected to the torque tube by a connecting rod. A spring urges the torque tube in a first direction, thereby causing the pawl to engage the ratchet. Rotation of the torque tube in the opposite direction causes the pawl to pivot away form the ratchet, thereby allowing the operator to release the brake.

12 Claims, 4 Drawing Sheets

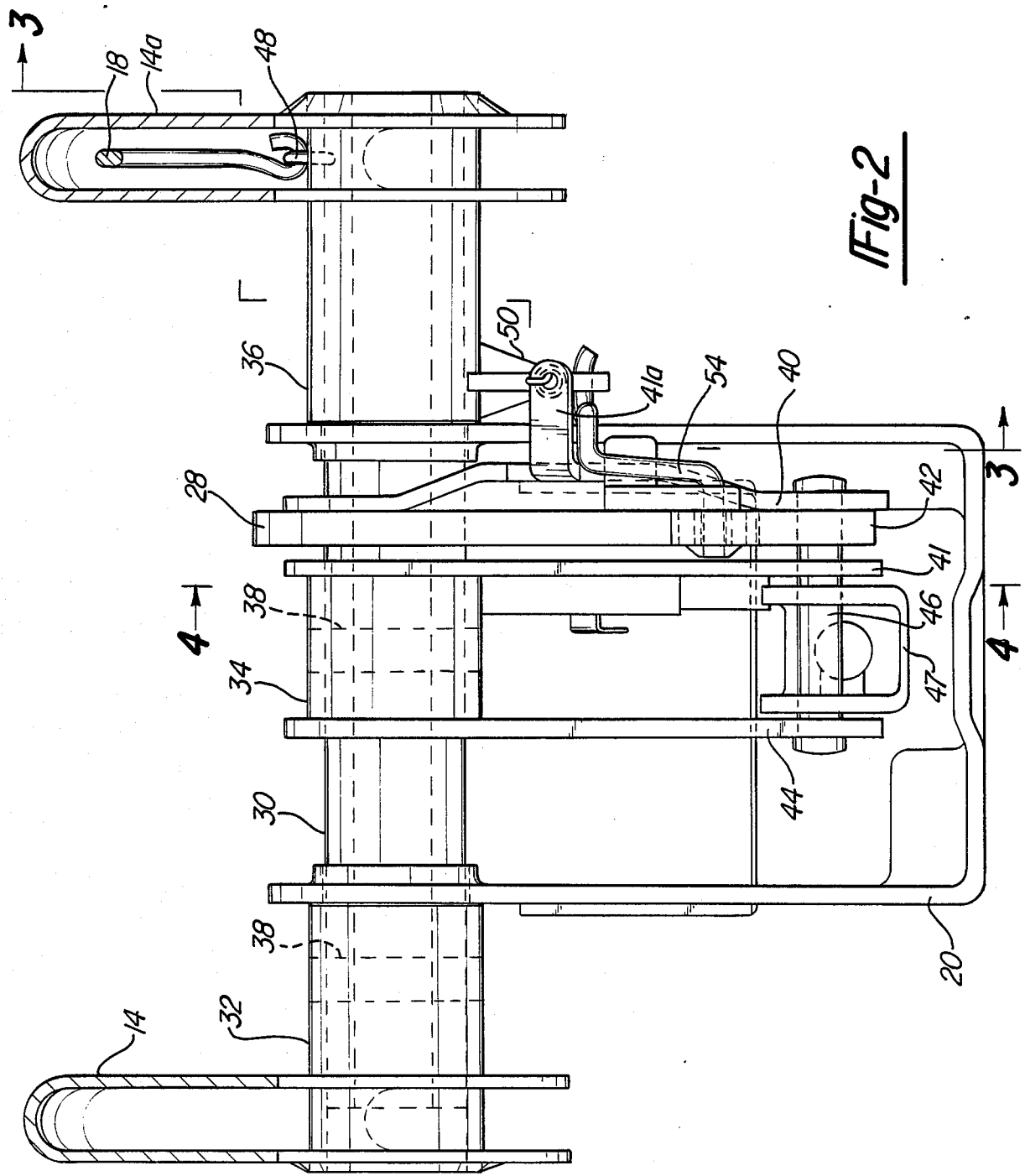

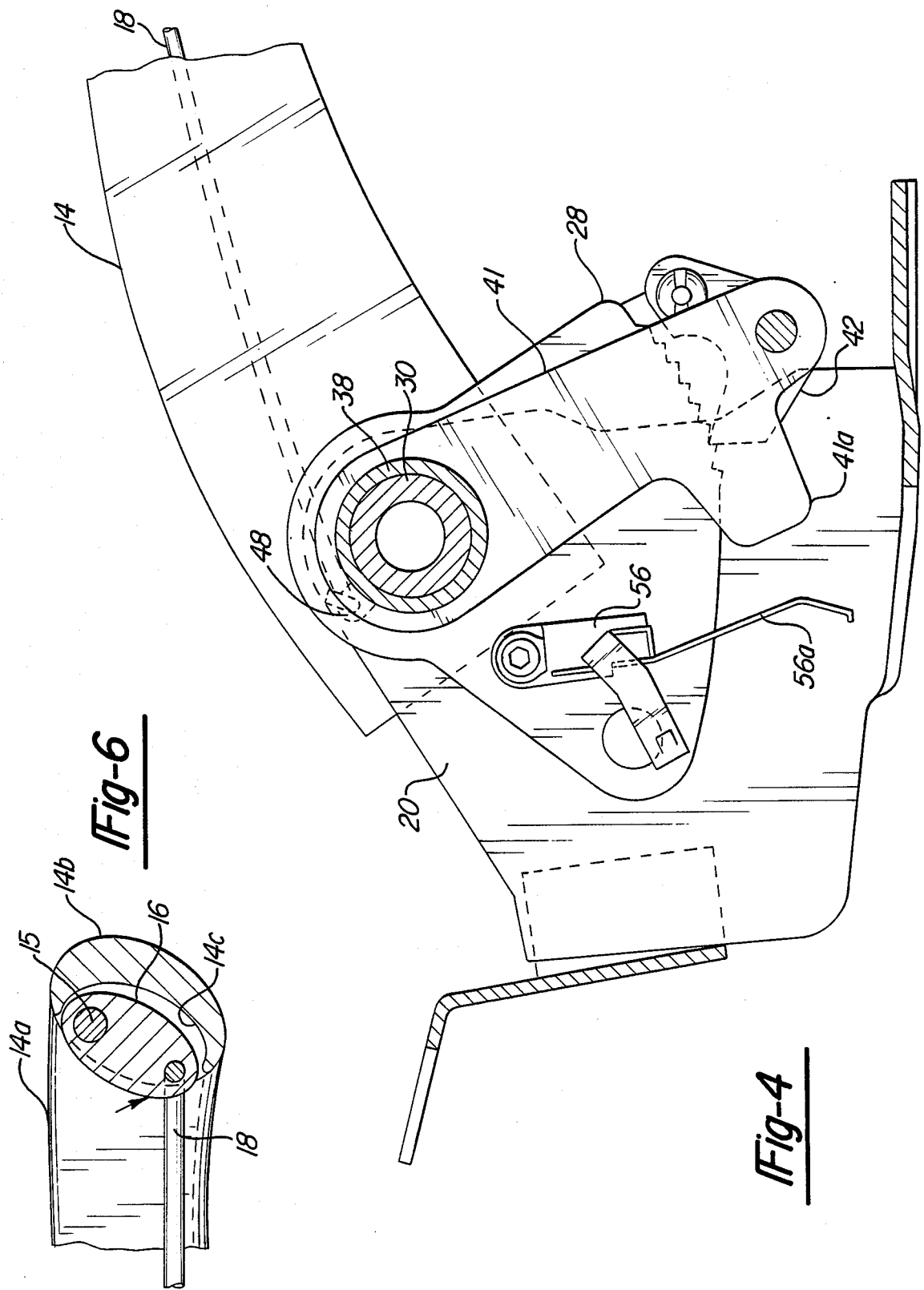

PARKING BRAKE ASSEMBLY

BACKGROUND OF THE INVENTION

1. Field of the Invention

The field of the invention relates to parking brake assemblies for motor vehicles.

2. Brief Description of the Prior Art

Parking brake assemblies are generally hand or foot operated, and function by displacing a cable connected to a brake mechanism. The cable is usually connected to a movable member which may be locked in position by a pawl and ratchet assembly. Releasing the pawl from the ratchet allows the tension to be withdrawn from the cable and the brake to be released.

Examples of such brake mechanisms may be found in U.S. Pat. Nos. 1,823,695, 2,467,557, 2,816,456, 2,986,046, 3,273,418 and 3,511,107.

SUMMARY OF THE INVENTION

A parking brake assembly is provided which is simple to operate, has a neat appearance, is light in weight and provides reliability in operation.

The assembly includes a ratchet and pawl locking mechanism which is actuated or deactuated by means of a tube or sleeve mounted to an axle. The pawl is operatively connected to the sleeve such that rotation of the sleeve in one direction causes the pawl to pivot into engagement with the ratchet, while rotation in the opposite direction causes the pawl to be released. A spring is employed to urge the sleeve in the one direction.

A release rod is connected to the sleeve and to a trigger assembly. When an operator squeezes the trigger assembly, the release rod causes the sleeve to rotate against the force of the spring, thereby releasing the pawl from the ratchet.

The invention allows the use of a U-shaped handle having a pair of arms, each of which is secured to an axle. The axle extends through a mounting bracket to which the ratchet is secured. The sleeve is mounted to the axle. Rotation of the axle is permitted in either direction upon disengagement of the pawl. A cable connected between a brake mechanism and a mounting member secured to the axle is displaced upon rotation of the axle, thereby allowing the brake to be set or released.

BRIEF DESCRIPTION OF THE DRAWING

FIG. 2 is a bottom plan view thereof;

FIG. 4 is a sectional view taken along line 4—4 of FIG. 2;

FIG. 6 is an enlarged, sectional view of the handle of the parking brake assembly, taken along lines 6—6 of FIG. 1.

DETAILED DESCRIPTION OF THE INVENTION

Figure 1:
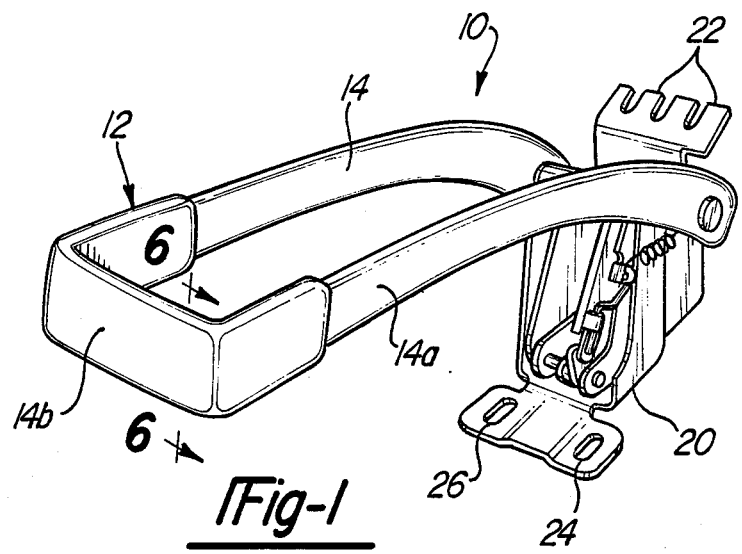
FIG. 1 is a perspective view of a parking brake assembly in accordance with the invention.
Figure 5:
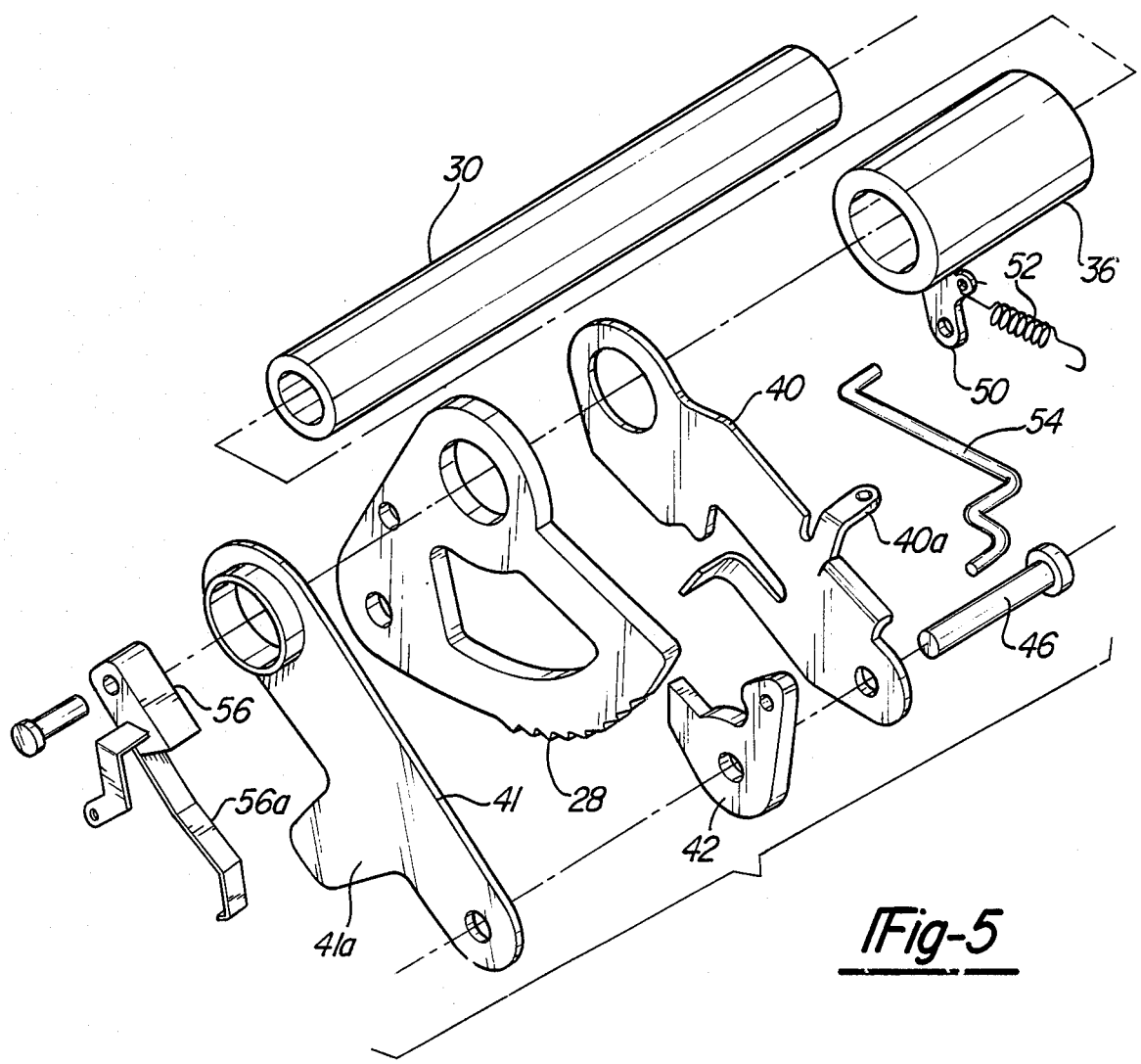
FIG. 5 is an exploded, perspective view of a portion of the parking brake assembly.

A parking brake 10 is provided which includes a U-shaped handle 12, having a pair of elongated arms 14, 14A that are generally U-shaped in cross section, as shown in FIG. 2. An end hand grip portion 14B connects arms 14, 14A. Referring to FIGS. 1 and 6, the inside of end portion 14B of handle 12 is undercut to provide a recess 14C which mounts a transverse rod 15 that pivotally supports a transverse trigger member 16. A steel rod 18 positioned within one of the two arms is secured at one end to the trigger 16 for movement therewith. As the trigger moves about its mounting axis, the rod moves back and forth within the channel defined by the handle arm, along its longitudinal axis. The opposite end of the rod is secured to the brake actuating assembly as described hereinafter.

The brake actuating assembly includes a mounting bracket 20 including appropriate slots 22 and openings 24, 26 to allow it to be secured to a motor vehicle body. A sector 28 including ratchet teeth is mounted to the bracket 20 and is immovable with respect thereto. An axle 30 extends between and is secured to the opposing handle arms 14, 14A. The handle and axle are rotatable as a unit with respect to the bracket 20.

Three sleeves 32, 34, 36 are mounted to the axle. Two of the sleeves 32, 34 are secured to the axle by pins 38 while the third 36, hereinafter referred to as the torque tube, is free to rotate with respect to the axle. The torque tube 36 and the first sleeve 32 extend between the outside surfaces of the mounting bracket 20 and the respective arms 14, 14A of the handle 12, thereby serving as spacers.

A pawl guide is mounted to the center sleeve 34. The guide includes a pair of substantially parallel spaced plates 40, 41. The sector 28 and pawl 42 are positioned between these two plates. The plate 40 nearest the torque tube includes a projection 40A having an opening therein. The projection includes a ninety degree bend such that it extends beyond the mounting bracket 20 and over the torque tube 36. A support arm 44 is secured to the center sleeve 34 in opposing relation to the pawl guide 40 plate 41. A second axle 46 is secured near the distal ends of the pawl guide and support arm and runs parallel to the first axle 30. The pawl 42 is pivotably mounted to this axle 46. A clevis 47 is pivotably mounted to the axle 46 between the pawl guide 40 and the support arm 44. A cable 49 may be secured to the clevis for actuating or deactuating the brake of a motor vehicle.

The torque tube 36 includes a pair of projections 48, 50. One projection 48 extends within the arm 14A of the handle and includes an opening for receiving the end of the release rod 18.

The second projection 50 is located near the opposite end of the torque 36, i.e., near the mounting bracket 20. It is also positioned ninety to one hundred eighty degrees rotationally with respect to the first projection 48. The second projection 50 includes a pair of openings. A coil spring 52 is connected between the first of the two openings and the projection 40A extending from the pawl guide. An actuator rod 54 is connected between the second of the two openings and an opening within the pawl 42.

A switch 56, which forms no part of the present invention, is secured to the sector 28. The pawl guide plate 41 includes a foot 41A which displaces a switch contact 56A when the handle 12 is rotated to the lowest position to extinguish an indicator light (not shown) when the parking brake is released.

Figure 3:
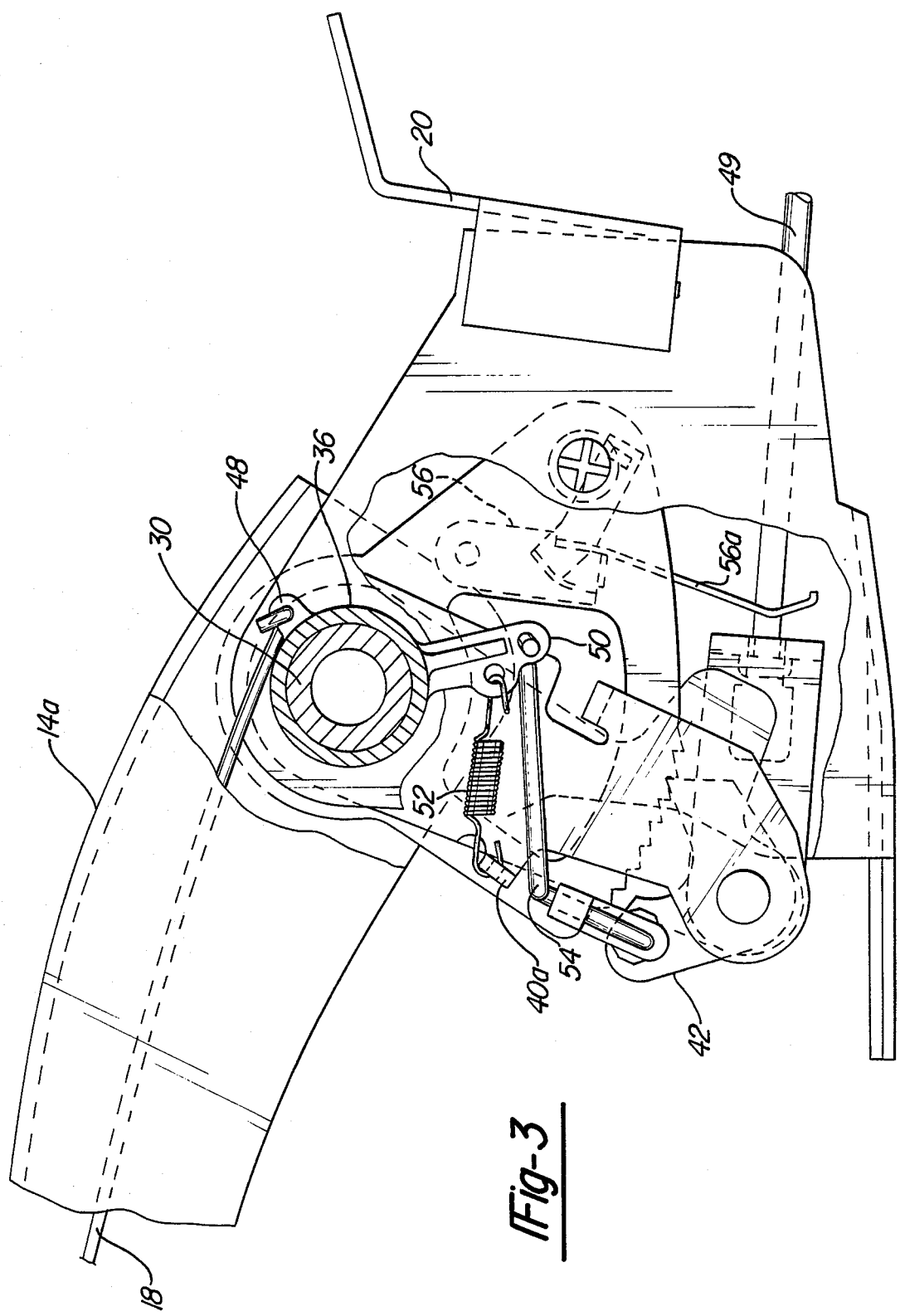
FIG. 3 is a sectional view taken along line 3—3 of FIG. 2.

In operation, the handle 12 is manually rotatable about an axis defined by the first axle 30. Starting from the raised (locked) position shown in FIG. 3, the operator squeezes handle portion 14B and the trigger 16 to move the trigger into handle recess 14C, thereby causing the rod 18 to rotate the torque tube 36 counterclockwise about its longitudinal axis, as viewed in FIG. 3. This rotation causes the actuator rod 54 to move the pawl 42 about the second axle 46, disengaging it from the sector 28. Handle 12 may then be lower to a substantially horizontal position, whereupon release of trigger 16 causes the spring 52 to urge the torque tube 30 clockwise. This moves pawl 42 towards an engaging position with the sector 28. The brake may be set by simply rotating the handle 12 towards a vertical position causing pawl 42 to "ratchet" as the angled teeth of sector 28 cam the pawl outwardly against the bias of the spring 52. Release of handle will engage pawl 42 with the teeth of sector 28 in a conventional manner to set the park brake via cable 49.

What is claimed is:

1. A parking brake assembly comprising a mounting bracket, an axle rotatably mounted on the mounting bracket, a handle secured to the axle for rotation therewith in opposing brake-release and brake-apply directions, means connecting the handle to a parking brake and biasing the handle in brake-release direction, a ratchet affixed to the mounting bracket, a pawl, means mounting the pawl on the axle for movement adjacent the ratchet with the handle at a position for selectively engaging the ratchet, a sleeve extending along and mounted on the axle for rotation relative thereto in opposing pawl-engaging and pawl-release directions, an actuator member interconnecting the pawl and sleeve for moving the pawl in response to sleeve movement, means biasing the sleeve in pawl-engage direction to prevent movement of the axle and handle in brake-release direction, and a release member mounted on the handle and operable to move the sleeve in pawl-release direction to disengage the pawl from the ratchet and enable movement of the axle and handle in brake-release direction.

2. The parking brake assembly of claim 1, including a second sleeve mounted on the axle for rotation therewith, and means pivotally mounting the pawl on the second sleeve.

3. An assembly as defined in claim 2 wherein said handle includes a substantially U-shaped arm, said release member being a rod positioned within said U-shaped arm.

4. An assembly as defined in claim 3 wherein said sleeve includes a first projection extending within said U-shaped arm, said rod being pivotably secured to said first projection.

5. An assembly as defined in claim 4 wherein said sleeve includes a second projection, said actuator member being connected to said second projection and said pawl.

6. An assembly as defined in claim 5 wherein said handle includes a pair of U-shaped arms, a trigger member being mounted between said arms, said release member being a rod connected between said trigger member and said sleeve, said axle extending between and secured to each of said arms.

7. A parking brake assembly for a motor vehicle comprising:
    a mounting bracket;
    a first axle rotatably mounted to said mounting bracket;
    a handle assembly including a pair of opposing arms and a handle member connecting said arms, each of said arms being secured to said first axle;
    a first sleeve rotatably mounted to said first axle and positioned between said mounting bracket and one of said arms;
    a ratchet secured to said mounting bracket;
    a pawl guide secured to said first axle;
    a second axle secured to said pawl guide;
    a pawl pivotably mounted to said second axle, said pawl being engageable with said ratchet;
    means for resiliently urging said first sleeve in a first rotational direction about said axle;
    means for rotating said first sleeve in a second rotational direction opposite to said first rotational direction, said rotating means including release means secured to said handle assembly; and
    means connecting said first sleeve and said pawl such that rotation of said first sleeve about said first axle causes rotation of said pawl about said second axle.

8. A parking brake assembly as defined in claim 7 including a clevis pivotably mounted to said second axle.

9. A parking brake assembly as defined in claim 7 including a second sleeve mounted to said first axle, said second sleeve being positioned between said mounting bracket and one of said arms, said mounting bracket being positioned between said first and second sleeves.

10. A parking brake assembly as defined in claim 7 wherein said first sleeve includes a first projection extending radially therefrom, and means pivotably connecting said first projection with said pawl.

11. A parking brake assembly as defined in claim 10 including a spring connecting said projection and said pawl guide.

12. A parking brake assembly as defined in claim 10 wherein said first sleeve includes a second projection extending radially therefrom, said release means direction being connected to said second projection.

* * * * *